(12) United States Patent
Tong et al.

(10) Patent No.: US 12,546,856 B2
(45) Date of Patent: Feb. 10, 2026

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Fangwei Tong, Machida (JP); Tooru Sahara, Yokohama (JP); Takuya Homma, Yokohama (JP); Jun Kuroda, Kodaira (JP)

(73) Assignee: KYOCERA Corporation, Kyoto (JP)

( * ) Notice: Subject to any disclaimer, the term of this patent is extended or adjusted under 35 U.S.C. 154(b) by 535 days.

(21) Appl. No.: 17/997,923

(22) PCT Filed: May 7, 2021

(86) PCT No.: PCT/JP2021/017595
§ 371 (c)(1),
(2) Date: Nov. 3, 2022

(87) PCT Pub. No.: WO2021/235251
PCT Pub. Date: Nov. 25, 2021

(65) Prior Publication Data
US 2023/0176181 A1 Jun. 8, 2023

(30) Foreign Application Priority Data
May 20, 2020 (JP) ................. 2020-088213

(51) Int. Cl.
*G01S 7/35* (2006.01)
*G01S 13/58* (2006.01)
*G01S 13/931* (2020.01)

(52) U.S. Cl.
CPC ............ *G01S 7/352* (2013.01); *G01S 13/584* (2013.01); *G01S 13/931* (2013.01)

(58) Field of Classification Search
CPC .. G01S 13/931; G01S 13/584; G01S 13/9027; G01S 7/411; G01S 7/41; G01S 7/417; G01S 7/412
(Continued)

(56) References Cited

U.S. PATENT DOCUMENTS 6,260,759 B1 * 7/2001 Nguyen ................. G01S 7/066
342/90
7,586,436 B2 * 9/2009 Wakayama ........... G01S 13/426
342/107
(Continued)

FOREIGN PATENT DOCUMENTS

JP 2003-057339 A 2/2003
JP 2006-080761 A 3/2006
(Continued)

*Primary Examiner* — Michael W Justice
(74) *Attorney, Agent, or Firm* — Studebaker Brackett PLLC

(57) ABSTRACT

An electronic device includes a transmission antenna, a reception antenna, and a controller. The transmission antenna transmits a transmission wave. The reception antenna receives a reflected wave that is the transmission wave having been reflected. The controller detects an object that reflects the transmission wave, based on a transmission signal transmitted as the transmission wave and a reception signal received as the reflected wave. The controller generates, based on reference data, a group from multiple pieces of detected data generated based on the detection of the object, and generates representative data based on one or more pieces of detected data included in the group.

1 Claim, 8 Drawing Sheets

(58) Field of Classification Search
USPC .................................................. 342/70, 109
See application file for complete search history.

(56) References Cited

U.S. PATENT DOCUMENTS

| | | | | |
|---|---|---|---|---|
| 7,750,840 B2* | 7/2010 | Wood | .................... | G01S 13/726 |
| | | | | 342/96 |
| 10,788,570 B2* | 9/2020 | Wilson | .................. | G01S 13/937 |
| 11,237,260 B2* | 2/2022 | Fujitsu | .................. | G01S 13/931 |
| 2014/0022110 A1* | 1/2014 | Itohara | .................... | G01S 13/58 |
| | | | | 342/107 |
| 2016/0189002 A1* | 6/2016 | Kawakami | ........... | G06V 10/757 |
| | | | | 382/218 |
| 2019/0101622 A1* | 4/2019 | Wilson | .................. | G01S 13/931 |
| 2019/0383931 A1* | 12/2019 | Fujitsu | .................. | G01S 13/589 |

FOREIGN PATENT DOCUMENTS

| | | |
|---|---|---|
| JP | 2010-266225 A | 11/2010 |
| JP | 2019-045300 A | 3/2019 |

* cited by examiner

FIG. 5

[TIME-POINT-INDEPENDENT GROUPING]

PIECES OF DETECTED DATA (TIME POINT: t0):
$d1(t0), d2(t0), d3(t0), \cdots, dN(t0)$ [N PIECES] ···S11

| GROUP | G1 (t0) | G2 (t0) | G3 (t0) | ··· | GL (t0) | |
|---|---|---|---|---|---|---|
| REFERENCE DATA | dr1 (t0) | dr2 (t0) | dr3 (t0) | ··· | drL (t0) | ···S12 |
| DETECTED DATA | da1 (t0)<br>db1 (t0)<br>dc1 (t0)<br>...<br>[M1 PIECES] | da2 (t0)<br>db2 (t0)<br>dc2 (t0)<br>...<br>[M2 PIECES] | da3 (t0)<br>db3 (t0)<br>dc3 (t0)<br>...<br>[M3 PIECES] | ··· | daL (t0)<br>dbL (t0)<br>dcL (t0)<br>...<br>[ML PIECES] | ···S13 |
| REPRESENTATIVE DATA | g1 (t0) | g2 (t0) | g3 (t0) | ··· | gL (t0) | ···S14 |

PIECES OF GENERATED REPRESENTATIVE DATA (TIME POINT: t0):
$g1(t0), g2(t0), g3(t0), \cdots, gL(t0)$ [L PIECES]

FIG. 7

[CONSECUTIVE GROUPING]

PIECES OF DETECTED DATA (TIME POINT: t1):
$d1(t1), d2(t1), d3(t1), \cdots, dN'(t1)$ [N' PIECES] $\cdots$S11

| GROUP | G1(t1) | G2(t1) | G3(t1) | $\cdots$ | GL'(t1) | |
|---|---|---|---|---|---|---|
| REFERENCE DATA | g1(t0) | g2(t0) | g3(t0) | $\cdots$ | gL'(t0) | $\cdots$S22 |
| DETECTED DATA | da1(t1) | da2(t1) | da3(t1) | $\cdots$ | daL'(t1) | $\cdots$S13 |
| | db1(t1) | db2(t1) | db3(t1) | $\cdots$ | dbL'(t1) | |
| | dc1(t1) | dc2(t1) | dc3(t1) | $\cdots$ | dcL'(t1) | |
| | ... | ... | ... | | ... | |
| | [M'1 PIECES] | [M'2 PIECES] | [M'3 PIECES] | | [M'L' PIECES] | |
| REPRESENTATIVE DATA | g1(t1) | g2(t1) | g3(t1) | $\cdots$ | gL'(t1) | $\cdots$S14 |

PIECES OF GENERATED REPRESENTATIVE DATA (TIME POINT: t1):
$g1(t1), g2(t1), g3(t1), \cdots, gL'(t1)$ [L' PIECES]

FIG. 8

[TIME-POINT-INDEPENDENT GROUPING]

REMAINING PIECES OF DETECTED DATA (TIME POINT: t1):
$du1(t1), du2(t1), du3(t1), \cdots, duK(t1)$ [K PIECES]

| GROUP | $G'1(t1)$ | $G'2(t1)$ | $\cdots$ | $G'L''(t1)$ |
|---|---|---|---|---|
| REFERENCE DATA | $dur1(t1)$ | $dur2(t1)$ | $\cdots$ | $durL''(t1)$ |
| DETECTED DATA | $dua1(t1)$ $dub1(t1)$ $\cdots$ [M'1 PIECES] | $dua2(t1)$ $dub2(t1)$ $\cdots$ [M'2 PIECES] | $\cdots$ | $duaL''(t1)$ $dubL''(t1)$ $\cdots$ [M'L'' PIECES] |
| REPRESENTATIVE DATA | $gL'+1(t1)$ | $gL'+2(t1)$ | $\cdots$ | $gL'+L''(t1)$ |

$\cdots$S25

PIECES OF GENERATED REPRESENTATIVE DATA (TIME POINT: t1):
$gL'+1(t1), gL'+2(t1), \cdots, gL'+L''(t1)$ [L'' PIECES]

ALL PIECES OF REPRESENTATIVE DATA (TIME POINT: t1):
$g1(t1), g2(t1), \cdots, gL'(t1), gL'+1(t1), gL'+2(t1), \cdots, gL'+L''(t1)$ [(L'+L'') PIECES]

$\cdots$S26

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2020-88213 filed in Japan on May 20, 2020, the entire disclosure of which is incorporated herein by reference.

TECHNICAL FIELD

The present disclosure relates to an electronic device, a method for controlling an electronic device, and a program.

BACKGROUND OF INVENTION

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and then receiving a reflected wave reflected off the object. Such a technology for measuring a distance or the like expectedly becomes more important in the future with progresses of a technology for assisting drivers in driving and an automated-driving-related technology for partially or entirely automating driving.

Various suggestions have been made on a technology for detecting the presence of a predetermined object by receiving a reflected wave of a radio wave that has been transmitted and reflected off the object. Several suggestions have been made particularly on a technique of appropriately processing data generated based on detection of an object. For example, Patent Literature 1 discloses determining whether detected objects are an identical object by comparing results of grouping pieces of detected data. Patent Literature 2 discloses grouping pieces of detected data based on a difference between velocities of detected objects.

CITATION LIST

Patent Literature

Patent Literature 1: Japanese Unexamined. Patent Application Publication No. 2010-266225
Patent Literature 2: Japanese Unexamined Patent Application Publication No. 2006-80761

SUMMARY

In one embodiment, an electronic device includes a transmission antenna, a reception antenna, and a controller. The transmission antenna is configured to transmit a transmission wave. The reception antenna is configured to receive a reflected wave that is the transmission wave having been reflected.

The controller is configured to detect an object that reflects the transmission wave, based on a transmission signal transmitted as the transmission wave and a reception signal received as the reflected wave.

The controller is configured to generate, based on reference data, a group from multiple pieces of detected data generated based on the detection of the object, and generate representative data based on one or more pieces of detected data included in the group.

In one embodiment, a method for controlling an electronic device includes
transmitting a transmission wave from a transmission antenna,
receiving, from a reception antenna, a reflected wave that is the transmission wave having been reflected,
detecting an object that reflects the transmission wave, based on a transmission signal transmitted as the transmission wave and a reception signal received as the reflected wave,
generating, based on reference data, a group from multiple pieces of detected data generated based on the detection of the object, and
generating representative data based on one or more pieces of detected data included in the group.

In one embodiment, a program causes
a computer to
transmit a transmission wave from a transmission antenna,
receive, from a reception antenna, a reflected wave that is the transmission wave having been reflected,
detect an object that reflects the transmission wave, based on a transmission signal transmitted as the transmission wave and a reception signal received as the reflected wave,
generate, based on reference data, a group from multiple pieces of detected data generated based on the detection of the object, and
generate representative data based on one or more pieces of detected data included in the group.

BRIEF DESCRIPTION OF THE DRAWINGS

FIG. 5 is a diagram for describing a process performed by the electronic device according to the first embodiment.
FIG. 7 is a diagram for describing a process performed by the electronic device according to the second embodiment.
FIG. 8 is a diagram for describing the process performed by the electronic device according to the second embodiment.

DESCRIPTION OF EMBODIMENTS

A technology for detecting a predetermined object by receiving a reflected wave that is a transmitted transmission wave reflected off the object desirably has an improved detection stability. The present disclosure provides an electronic device, a method for controlling an electronic device, and a program that can stabilize detection of a target. According to one embodiment, an electronic device, a method for controlling an electronic device, and a program that can stabilize detection of a target can be provided. One embodiment is described in detail below with reference to the drawings.

An electronic device according to one embodiment is mounted in a vehicle (mobility device) such as an automobile, for example, and is capable of detecting, as a target, a predetermined object located around the mobility device. To this end, the electronic device according to the one embodiment is capable of transmitting a transmission wave to an area around the mobility device from a transmission antenna installed on or in the mobility device. The electronic device according to the one embodiment is also capable of receiving a reflected wave that is the reflected transmission wave, from a reception antenna installed on or in the mobility device. For example, a radar sensor or the like installed on or in the mobility device may include at least one of the transmission antenna or the reception antenna.

A typical configuration example is described below in which the electronic device according to the one embodiment is mounted in an automobile such as a passenger car. However, the mobility device in which the electronic device according to the one embodiment is mounted is not limited to an automobile. The electronic device according to the one embodiment may be mounted in various mobility devices such as an autonomous car, a bus, a taxi, a truck, a motorcycle, a bicycle, a ship, an aircraft, a helicopter, agricultural machinery such as a tractor, a snowplow, a garbage truck, a police car, an ambulance, and a drone. The mobility device in which the electronic device according to the one embodiment is mounted is not necessarily limited to a mobility device that moves by its own motive power. For example, the mobility device in which the electronic device according to the one embodiment is mounted may be a trailer towed by a tractor. The electronic device according to the one embodiment is capable of measuring a distance or the like between a sensor and a predetermined object when at least one of the sensor or the object is movable. The electronic device according to the one embodiment is also capable of measuring a distance or the like between the sensor and the object even when both the sensor and the object are stationary.

An example of how the electronic device according to the one embodiment detects an object is described.

Figure 1:
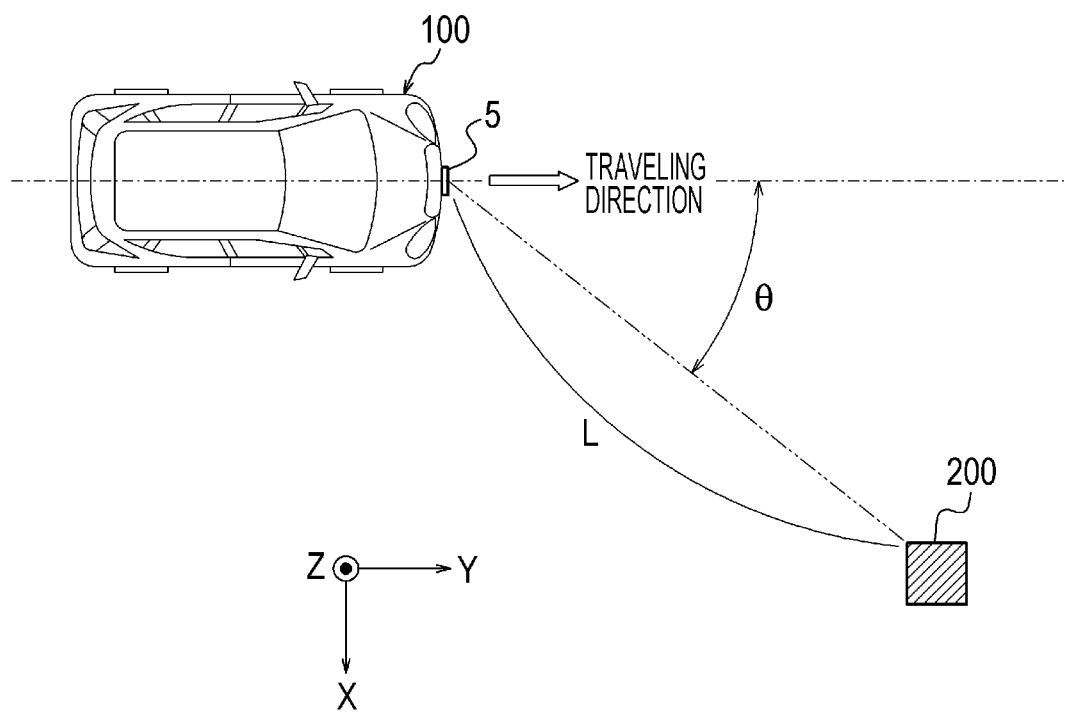
FIG. 1 is a diagram for describing how an electronic device according to one embodiment is used.

FIG. 1 is a diagram for describing how the electronic device according to the one embodiment is used. FIG. 1 illustrates an example in which a sensor including a transmission antenna and a reception antenna according to the one embodiment is installed on a mobility device.

A mobility device 100 illustrated in FIG. 1 includes a sensor 5 installed thereon. The sensor 5 includes a transmission antenna and a reception antenna according to the one embodiment. The mobility device 100 illustrated in FIG. 1 includes an electronic device 1 according to the one embodiment mounted (for example, built) therein. A specific configuration of the electronic device 1 is described later. The sensor 5 may include at least one of the transmission antenna or the reception antenna, for example. The sensor 5 may appropriately include at least any of other functional units, such as at least part of a controller 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as a target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as radar and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival θ) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling next to the mobility device 100, an automobile traveling in front of or behind the mobility device 100 in the same lane, or the like. The object 200 may be any object located around the mobility device 100, such as a motorcycle, a bicycle, a stroller, a person such as a pedestrian, an animal, other forms of life such as an insect, a plant, a guardrail, a median strip, a road sign, a step on a sidewalk, a wall, a maintenance hole, a rock, a wall, or an obstacle. The object 200 may be in motion or stationary. For example, the object 200 may be an automobile or the like that is parked or stationary around the mobility device 100. In the present disclosure, the object detected by the sensor 5 includes a living thing such as a person or an animal in addition to a non-living thing. The object detected by the sensor 5 in the present disclosure includes a target, which includes a person, an object, a plant, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed on an outer portion of the mobility device 100. However, in one embodiment, the sensor 5 may be installed at various positions of the mobility device 100. For example, in one embodiment, the sensor 5 may be installed inside a bumper of the mobility device 100 so as not to be seen in the appearance of the mobility device 100.

A typical example is described below in which the transmission antenna of the sensor 5 transmits a radio wave in a frequency band, such as a millimeter wave (equal to or higher than 30 GHz) or a quasi-millimeter wave (for example, around 20 GHz to 30 GHz). For example, the transmission antenna of the sensor 5 may transmit a radio wave having a frequency bandwidth of 4 GHz such as from 77 GHz to 81 GHz.

Figure 2:
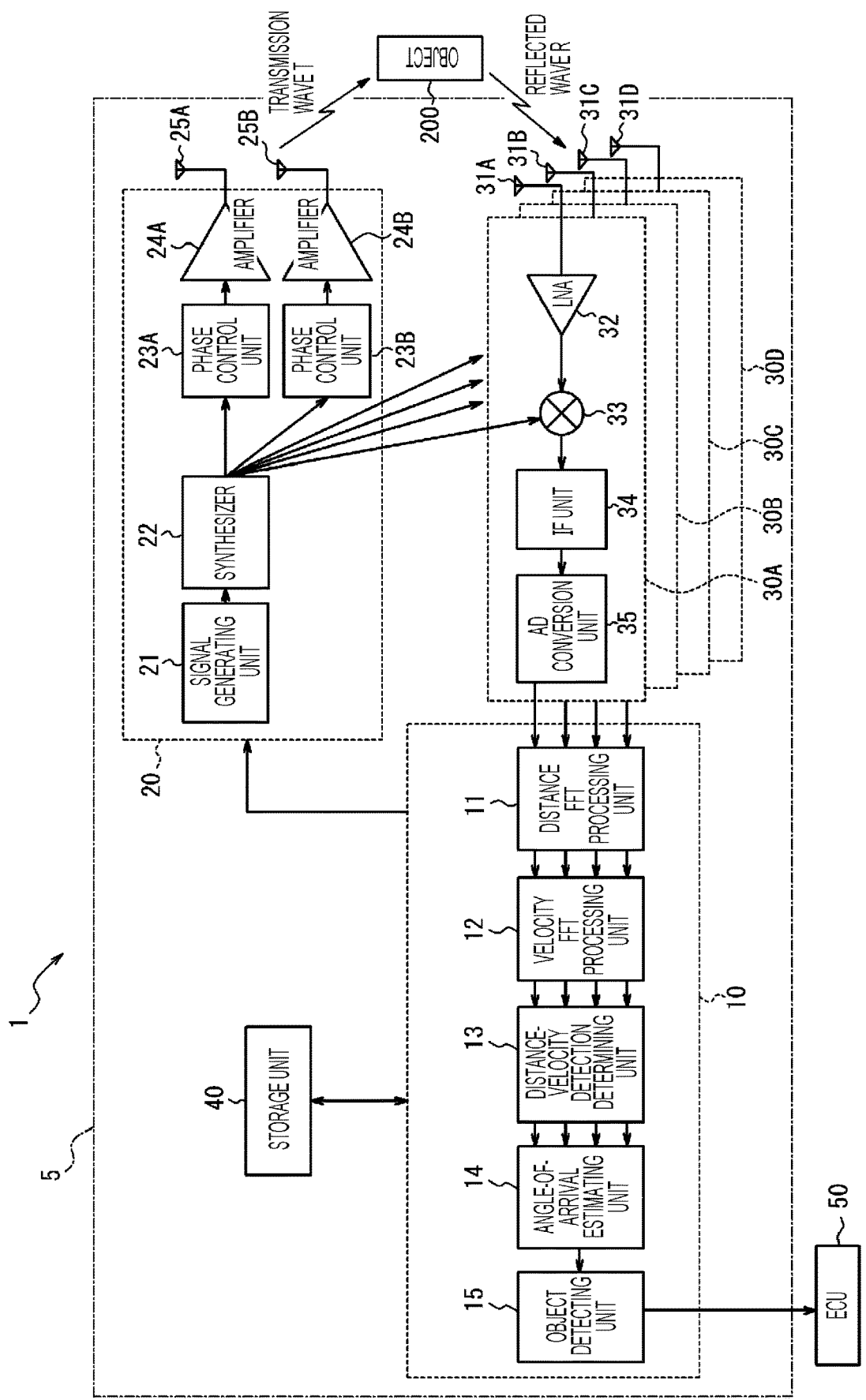
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency band of 79 GHz characteristically has a wider usable frequency bandwidth than another millimeter-wave and/or quasi-millimeter-wave radar of a frequency band of 24 GHz, 60 GHz, or 76 GHz, for example. Such an embodiment is described below as an example.

As illustrated in FIG. 2, the electronic device 1 according to the one embodiment includes the sensor 5 and an ECU (Electronic Control Unit) 50. The ECU 50 controls various operations of the mobility device 100. The ECU 50 may include at least one or more ECUs. The electronic device 1 according to the one embodiment includes the controller 10. The electronic device 1 according to the one embodiment may also appropriately include another functional unit such as at least any of a transmission unit 20, reception units 30A to 30D, or a storage unit 40. As illustrated in FIG. 2, the electronic device 1 may include multiple reception units such as the reception units 30A to 30D. When the reception units 30A, 30B, 30C, and 30D are not distinguished from one another, the reception units 30A, 30B, 30C, and 30D are simply referred to as "reception units 30" below.

The controller 10 may include a distance FFT processing unit 11, a velocity FFT processing unit 12, a distance-velocity detection determining unit 13, an angle-of-arrival estimating unit 14, and an object detecting unit 15. These functional units included in the controller 10 are further described later.

As illustrated in FIG. 2, the transmission unit 20 may include a signal generating unit 21, a synthesizer 22, phase control units 23A and 23B, amplifiers 24A and 24B, and transmission antennas 25A and 259. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the multiple reception units 30 may include an LNA 32, a mixer 33, an IF unit 34, and an AD conversion unit 35. The reception units 30A to 30D may have the same configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the controller 10.

The controller 10 included in the electronic device 1 according to the one embodiment is capable of controlling the individual functional units of the electronic device 1 and controlling operations of the entire electronic device 1. To provide control and processing capabilities for executing various functions, the controller 10 may include at least one processor, for example, a CPU (Central Processing Unit). The controller 10 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In the one embodiment, the controller 10 may be configured as, for example, a CPU and a program executed by the CPU. The controller 10 may appropriately include a memory necessary for operations of the controller 10.

The storage unit 40 may store a program executed by the controller 10, results of processing performed by the controller 10, and so on. The storage unit 40 may function as a work memory of the controller 10. The storage unit 40 may include, for example, a semiconductor memory or a magnetic disk. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the controller 10 as described above.

In the one embodiment, the storage unit 40 may store various parameters for setting a range in which an object is detected based on a transmission wave T transmitted from each transmission antenna 25 and a reflected wave R received from each reception antenna 31.

In the electronic device 1 according to the one embodiment, the controller 10 is capable of controlling at least one of the transmission unit 20 or the reception units 30. In this case, the controller 10 may control at least one of the transmission unit 20 or the reception units 30, based on various kinds of information stored in the storage unit 40. In the electronic device 1 according to the one embodiment, the controller 10 may instruct the signal generating unit 21 to generate a signal or may control the signal generating unit 21 to generate a signal.

In accordance with control performed by the controller 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the controller 10, for example. Specifically, the signal generating unit 21 may allocate a frequency of the transmission signal in accordance with a parameter set by the controller 10, for example. For example, the signal generating unit 21 receives frequency information from the controller 10 or the storage unit 40 and generates a signal having a predetermined frequency in a frequency band such as from 77 GHz to 81 GHz, for example. The signal generating unit 21 may include a functional unit such as a voltage control oscillator (VCO), for example.

The signal generating unit 21 may be configured as hardware having the function, for example as a microcomputer, or for example as a processor such as a CPU and a program or the like executed by the processor. Each functional unit described below may also be configured as hardware having the function, for example as a microcomputer if possible, or for example as a processor such as a CPU and a program or the like executed by the processor if possible.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. For example, the controller 10 may set in advance the signal generated by the signal generating unit 21. For example, the storage unit 40 or the like may store in advance the signal generated by the signal generating unit 21. Since a chirp signal used in a technical field such as the radar is known, more detailed description is appropriately simplified or omitted. The signal generated by the signal generating unit 21 is supplied to the synthesizer 22.

Figure 3:
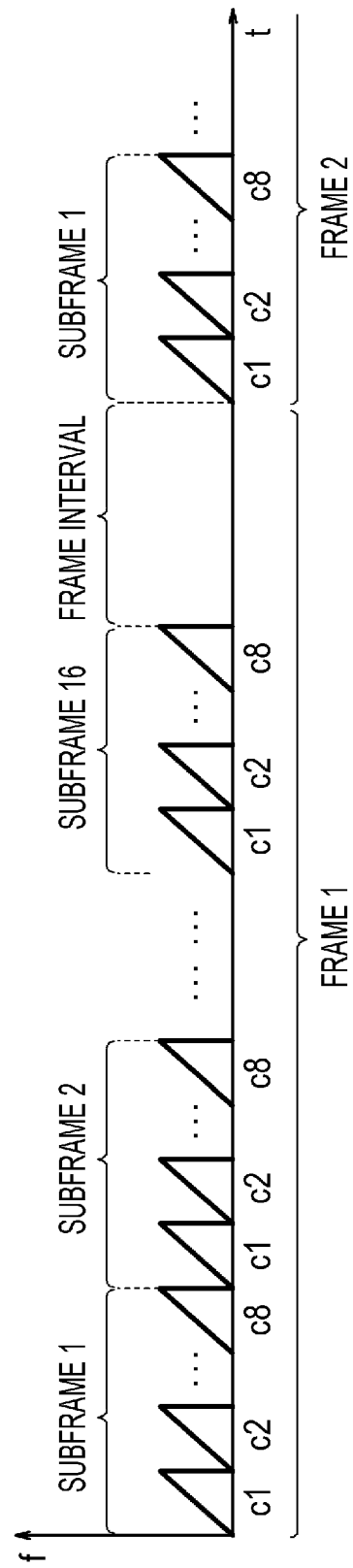
FIG. 3 is a diagram for describing a structure of a transmission signal according to the one embodiment.

FIG. 3 is a diagram for describing an example of chirp signals generated by the signal generating unit 21.

In FIG. 3, the horizontal axis represents elapsed time, and the vertical axis represents a frequency. In the example illustrated in FIG. 3, the signal generating unit 21 generates linear chirp signals whose frequency changes linearly and periodically. FIG. 3 illustrates chirp signals $c1, c2, \ldots, c8$. As illustrated in FIG. 3, the frequency of each chirp signal linearly increases as time elapses.

In the example illustrated in FIG. 3, one subframe includes eight chirp signals $c1, c2, \ldots, c8$. That is, each of subframes such as a subframe 1 and a subframe 2 illustrated in FIG. 3 includes eight chirp signals $c1, c2, \ldots, c8$. In the example illustrated in FIG. 3, one frame includes 16 subframes such as the subframes 1 to 16. That is, each of frames such as a frame 1 and a frame 2 illustrated in FIG. 3 includes 16 subframes. As illustrated in FIG. 3, a frame interval of a predetermined length may be included between frames. Each single frame illustrated in FIG. 3 may have a length of about 30 ms to 50 ms, for example.

In FIG. 3, the frame 2 and subsequent frames may have the same configuration. In FIG. 3, the frame 3 and subsequent frames may have the same configuration. In the electronic device 1 according to the one embodiment, the signal generating unit 21 may generate a transmission signal as any number of frames. In FIG. 3, an illustration of some chirp signals is omitted. As described above, for example, the storage unit 40 or the like may store a relationship between time and a frequency of the transmission signal generated by the signal generating unit 21.

As described above, the electronic device 1 according to the one embodiment may transmit a transmission signal constituted by subframes each including multiple chirp signals. The electronic device 1 according to the one embodiment may transmit a transmission signal constituted by frames each including a predetermined number of subframes.

Description is given below on the assumption that the electronic device 1 transmits a transmission signal having the frame structure illustrated in FIG. 3. However, the frame structure illustrated in FIG. 3 is an example. For example, the number of chirp signals included in one subframe is not limited to eight. In one embodiment, the signal generating unit 21 may generate a subframe including any number of (for example, multiple) chirp signals. The subframe structure illustrated in FIG. 3 is also an example. For example, the number of subframes included in one frame is not limited to 16. In one embodiment, the signal generating unit 21 may generate a frame including any number of (for example, multiple) subframes. The signal generating unit 21 may generate signals having different frequencies. The signal generating unit 21 may generate multiple discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. For example, the controller 10 may set the frequency selected as the frequency of the transmission wave T to be transmitted from each of the transmission antennas 25. For example, the storage unit 40 may store the frequency selected as the frequency of the transmission wave T to be transmitted from each of the transmission antennas 25. The signal whose frequency has been increased by the synthesizer 22 is supplied to the phase control unit 23 and the mixer 33. When multiple phase control units 23 are present, the signal whose frequency has been increased by the synthesizer 22 may be supplied to each of the multiple phase control units 23. When multiple reception units 30 are present, the signal whose frequency has been increased by the synthesizer 22 may be supplied to the mixer 33 of each of the multiple reception units 30.

Each of the phase control units 23 controls a phase of the transmission signal supplied from the synthesizer 22. Specifically, for example, in accordance with control performed by the controller 10, each of the phase control units 23 may appropriately advance or delay the phase of the signal supplied from the synthesizer 22 to adjust the phase of the transmission signal. In this case, based on a difference between paths of the transmission waves T to be transmitted from the respective transmission antennas 25, the phase control units 23 may adjust the phases of the respective transmission signals. The phase control units 23 appropriately adjust the phases of the respective transmission signals, so that the transmission waves T transmitted from the respective transmission antennas 25 enhance with each other in a predetermined direction to form a beam (beamforming). In this case, for example, the storage unit 40 may store a correlation between a direction of beamforming and amounts of phase by which the respective transmission signals transmitted by the respective transmission antennas 25 are to be controlled. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the controller 10, for example. When the sensor 5 includes multiple transmission antennas 25, each of the multiple amplifiers 24 may amplify power (electric power) of the transmission signal supplied from a respective one of the phase control units 23 in accordance with control performed by the controller 10, for example. Since the technology for amplifying power of a transmission signal is already known, more detailed description is omitted. The amplifier 24 is connected to the transmission antenna 25.

The transmission antenna 25 outputs (transmits), as the transmission wave T, the transmission signal amplified by the amplifier 24. When the sensor 5 includes multiple transmission antennas 25, each of the multiple transmission antennas 25 may output (transmit), as the transmission wave T, the transmission signal amplified by a respective one of the multiple amplifiers 24. Since the transmission antennas 25 can be configured in a manner that is the same as and/or similar to transmission antennas for use in the known radar technology, more detailed description is omitted.

Accordingly, the electronic device 1 according to the one embodiment, which includes the transmission antennas 25, can transmit transmission signals (for example, transmission chirp signals) as the transmission waves T from the respective transmission antennas 25. At least one of the functional units of the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the transmission antennas 25 with a member such as the radar cover can reduce a risk of the transmission antennas 25 being damaged or malfunctioning because of a contact with an external object. The radar cover and the housing may also be referred to as a radome.

FIG. 2 illustrates an example in which the electronic device 1 includes two transmission antennas 25. However, in one embodiment, the electronic device 1 may include any number of transmission antennas 25. On the other hand, in one embodiment, the electronic device 1 may include multiple transmission antennas 25 when the transmission waves T transmitted from the respective transmission antennas 25 form a beam in a predetermined direction. In one embodiment, the electronic device 1 may include multiple transmission antennas 25. In this case, the electronic device 1 may include the multiple phase control units 23 and the multiple amplifiers 24 to correspond to the multiple transmission antennas 25. Each of the multiple phase control units 23 may control the phase of a respective one of the multiple transmission waves supplied from the synthesizer 22 and to be transmitted from the respective transmission antennas 25. Each of the multiple amplifiers 24 may amplify power of a respective one of the multiple transmission signals to be transmitted from the respective transmission antennas 25. In this case, the sensor 5 may include the multiple transmission antennas. As described above, when the electronic device 1 illustrated FIG. 2 includes the multiple transmission antennas 25, the electronic device 1 may include multiple functional units necessary for transmitting the transmission waves T from the multiple transmission antennas 25.

The reception antenna 31 receives the reflected wave R. The reflected wave R may be the transmission wave T reflected off the predetermined object 200. The reception antenna 31 may include multiple antennas such as the reception antennas 31A to 31D, for example. Since the reception antennas 31 can be configured in a manner that is the same as and/or similar to reception antennas for use in the known radar technology, more detailed description is omitted. The reception antenna 31 is connected to the LNA 32. A reception signal based on the reflected wave R received by the reception antenna 31 is supplied to the LNA 32.

The electronic device 1 according to the one embodiment can receive, from each of the multiple reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. Covering the reception antennas 31 with a member such as the radar cover can reduce a risk of the reception antennas 31 being damaged or malfunctioning because of a contact with an external object. The radar cover and the housing may also be referred to as a radome.

When the reception antenna 31 is installed near the transmission antenna 25, these reception antenna 31 and transmission antenna 25 may be collectively included in one sensor 5. That is, for example, one sensor 5 may include at least one transmission antenna 25 and at least one reception antenna 31. For example, one sensor 5 may include multiple transmission antennas 25 and multiple reception antennas 31. In such a case, one radar sensor may be covered with a cover member such as one radar cover, for example.

The LNA 32 amplifies, with low noise, the reception signal based on the reflected wave R received by the reception antenna 31. The LNA 32 may be a low-noise amplifier and amplifies, with low noise, the reception signal supplied from the reception antenna 31. The reception signal amplified by the LNA 32 is supplied to the mixer 33.

The mixer 33 mixes (multiplies) the reception signal having a radio frequency (RF) and supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may include any analog-to-digital conversion circuit (Analog-to-Digital Converter (ADC)). The digitized beat signal obtained by the AD conversion unit 35 is supplied to the distance FFT processing unit 11 of the controller 10. When multiple reception units 30 are present, the digitized beat signals obtained by the respective AD conversion units 35 may be supplied to the distance FFT processing unit 11.

The distance FFT processing unit 11 estimates a distance between the mobility device 100 equipped with the electronic device 1 and the object 200, based on the beat signals supplied from the respective AD conversion units 35. The distance FFT processing unit 11 may include a processing unit that performs fast Fourier transform, for example. In this case, the distance FFT processing unit 11 may be configured as any circuit, any chip, or the like that performs fast Fourier transform (FFT).

The distance FFT processing unit 11 performs FFT processing (hereinafter, appropriately referred to as "distance FFT processing") on the digitized beat signals obtained by the AD conversion units 35. For example, the distance FFT processing unit 11 may perform the FFT processing on a complex signal supplied from each of the AD conversion units 35. The digitized beat signal obtained by each of the AD conversion units 35 can be represented as a temporal change in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, in a known method such as constant false alarm rate (CFAR)-based detection processing, an object (reflecting object) that reflects a transmission wave is determined to be present if a peak value that is equal to or greater than a threshold is detected from the average power or amplitude of a disturbance signal.

As described above, the electronic device 1 according to the one embodiment can detect, as the target, the object 200 that reflects the transmission wave T, based on the transmission signal transmitted as the transmission wave T and the reception signal received as the reflected wave R.

The distance FFT processing unit 11 can estimate a distance to the predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The result of the distance FFT processing performed by the distance FFT processing unit 11 (for example, distance information) may be supplied to the velocity FFT processing unit 12. The result of the distance FFT processing performed by the distance FFT processing unit 11 may also be supplied to the distance-velocity detection determining unit 13, the object detecting unit 15, and/or the like.

The velocity FFT processing unit 12 estimates a relative velocity between the mobility device 100 equipped with the electronic device 1 and the object 200, based on the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured as any circuit, any chip, or the like that performs fast Fourier transform (FFT).

The velocity FFT processing unit 12 further performs FFT processing (hereinafter, appropriately referred to as "velocity FFT processing") on each beat signal on which the distance FFT processing has been performed by the distance FFT processing unit 11. For example, the velocity FFT processing unit 12 may perform the FFT processing on each complex signal supplied from the distance FFT processing unit 11. The velocity FFT processing unit 12 can estimate a relative velocity to the predetermined object on the basis of a subframe (for example, the subframe 1 illustrated in FIG. 3) including chirp signals. When the distance FFT processing is performed on the beat signal in the above-described manner, multiple vectors can be generated. The velocity FFT processing unit 12 can estimate a relative velocity to the predetermined object by determining a phase of a peak in a result of the velocity FFT processing performed on these multiple vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. The result of the velocity FFT processing performed by the velocity FFT processing unit 12 (for example, velocity information) may be supplied to the angle-of-arrival estimating unit 14. The result of the velocity FFT processing performed by the velocity FFT processing unit 12 may also be supplied to the distance-velocity detection determining unit 13, the object detecting unit 15, and/or the like.

The distance-velocity detection determining unit 13 performs determination processing for a distance and/or a relative velocity, based on the result of the distance FFT processing performed by the distance FFT processing unit 11 and/or the result of the velocity FFT processing performed by the velocity FFT processing unit 12. The distance-velocity detection determining unit 13 determines whether the target is detected at a predetermined distance and/or a predetermined relative velocity. The distance-velocity detection determining unit 13 is further described below.

The angle-of-arrival estimating unit 14 estimates a direction from which the reflected wave R arrives from the predetermined object 200, based on the result of the velocity FFT processing performed by the velocity FFT processing unit 12. The angle-of-arrival estimating unit 14 may estimate the direction, based on data other than the result of the velocity FFT processing performed by the velocity FFT processing unit 12. For example, the angle-of-arrival estimating unit 14 may estimate the direction from which the reflected wave R from the predetermined object 200 arrives, based on the result determined by the distance-velocity detection determining unit 13 or the like. The electronic device 1 can estimate the direction from which the reflected wave R arrives, by receiving the reflected wave R from the multiple reception antennas 31. For example, the multiple reception antennas 31 are arranged at a predetermined interval. In this case, the transmission wave T transmitted from each of the transmission antennas 25 is reflected off the predetermined object 200 to become the reflected wave R. Each of the multiple reception antennas 31 arranged at the predetermined interval receives the reflected wave R. The angle-of-arrival estimating unit 14 can estimate the direction from which the reflected wave R arrives at each of the multiple reception antennas 31, based on the phase of the reflected wave R received by the reception antenna 31 and a difference in path of the reflected wave R. That is, the electronic device 1 can measure (estimate) the angle of arrival θ illustrated in FIG. 1, based on the result of the velocity FFT processing. In measurement (estimation) of the angle of arrival θ, the angle-of-arrival estimating unit 14 may estimate the direction, based on data other than the result of the velocity FFT processing performed by the velocity FFT processing unit 12. For example, the angle-of-arrival estimating unit 14 may measure (estimate) the angle of arrival θ, based on the result determined by the distance-velocity detection determining unit 13 or the like.

Various techniques for estimating the direction from which the reflected wave R arrives based on a result of velocity FFT processing have been proposed. For example, MUSIC (MUltiple Signal Classification), ESPRIT (Estimation of Signal Parameters via Rotational Invariance Technique), and the like are known direction-of-arrival estimation algorithms. Thus, more detailed description of the known techniques is appropriately simplified or omitted. Information (angle information) on the angle of arrival θ estimated by the angle-of-arrival estimating unit 14 may be supplied to the object detecting unit 15.

The object detecting unit 15 detects an object located in a range to which the transmission wave T is transmitted, based on the information supplied from at least any of the distance FFT processing unit 11, the velocity FFT processing unit 12, or the angle-of-arrival estimating unit 14. The object detecting unit 15 may perform detection of an object by performing, for example, clustering processing based on the supplied distance information, velocity information, and angle information. For example, DBSCAN (Density-based spatial clustering of applications with noise) or the like is a known algorithm used in clustering of data. In the clustering processing, for example, average power of points constituting the detected object may be calculated. The distance information, the velocity information, the angle information, and the power information of the object detected by the object detecting unit 15 may be supplied to the ECU 50 or the like, for example. In this case, when the mobility device 100 is an automobile, communication may be performed using a communication interface such as a CAN (Controller Area Network), for example.

As described above, the electronic device 1 may include the transmission antenna 25, the reception antenna 31, and the controller 10. The transmission antenna 25 transmits the transmission wave T. The reception antenna 31 receives the reflected wave R that is the transmission wave T having been reflected. The controller 10 detects an object (for example, the object 200) that reflects the transmission wave T, based on a transmission signal transmitted as the transmission wave T and a reception signal received as the reflected wave R.

The ECU 50 included in the electronic device 1 according to the one embodiment is capable of controlling functional units of the mobility device 100 and controlling operations of the entire mobility device 100. To provide control and processing capabilities for executing various functions, the ECU 50 may include at least one processor, for example, a CPU (Central Processing Unit). The ECU 50 may be collectively implemented by one processor, may be implemented by some processors, or may be implemented by discrete individual processors. The processor may be implemented as one integrated circuit. The integrated circuit is also referred to as an IC. The processor may be implemented as multiple integrated circuits and discrete circuits connected to be able to perform communication. The processor may be implemented based on various other known technologies. In one embodiment, the ECU 50 may be configured as, for example, a CPU and a program executed by the CPU. The ECU 50 may appropriately include a memory necessary for operations of the ECU 50. At least part of the functions of the controller 10 may be functions of the ECU 50, or at least part of the functions of the ECU 50 may be functions of the controller 10.

The electronic device 1 illustrated in FIG. 2 includes two transmission antennas 25 and four reception antennas 31. However, the electronic device 1 according to the one embodiment may include any number of transmission antennas 25 and any number of reception antennas 31. For example, by including the two transmission antennas 25 and the four reception antennas 31, the electronic device 1 can include a virtual antenna array that is virtually constituted by eight antennas. As described above, the electronic device 1 may receive the reflected wave R of 16 subframes illustrated in FIG. 3 by using, for example, the eight virtual antennas.

First Embodiment

An operation of the electronic device 1 according to a first embodiment is described below. The operation of the electronic device 1 according to the first embodiment is also referred to as "time-point-independent grouping" since a data group is generated independently for each time point (time) when detected data is detected.

Figure 4:
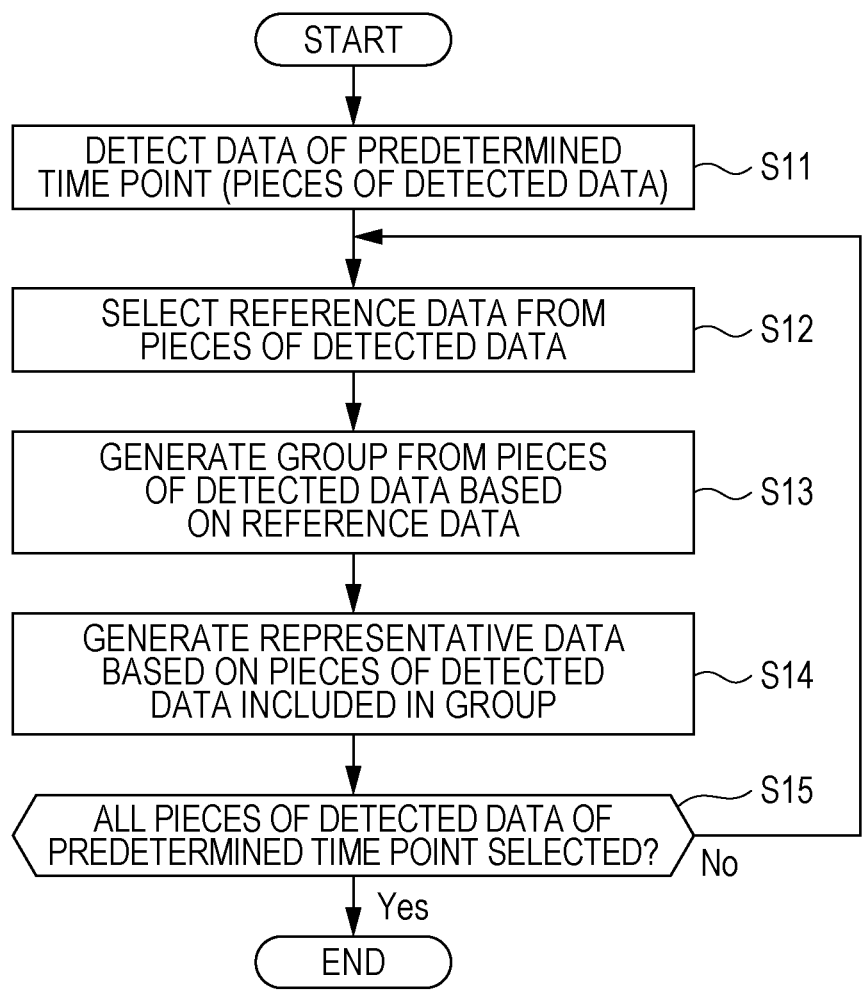
FIG. 4 is a flowchart for describing an operation of an electronic device according to a first embodiment.

FIG. 4 is a flowchart for describing the operation of the electronic device 1 according to the first embodiment. FIG. 5 is a diagram for describing a process performed by the electronic device 1 according to the first embodiment. The operation of the electronic device 1 according to the first embodiment is described below with reference to FIGS. 4 and 5.

In the description, in response to the start of the operation illustrated in FIG. 4, the controller 10 detects an object that reflects the transmission wave T, based on the transmission signal transmitted as the transmission wave T and the reception signal received as the reflected wave R. In the description below, in response to the start of the operation illustrated in FIG. 4, the controller 10 detects a distance between the object 200 and the electronic device 1, as pieces of detected data based on detection of the object 200 that reflects the transmission wave T. In this case, the controller 10 may detect the distance between the object 200 and the electronic device 1. Alternatively, the distance FFT processing unit 11 or the distance-velocity detection determining unit 13 may detect the distance. The pieces of detected data based on detection of the object 200 that reflects the transmission wave T are not limited to the distance between the object 200 and the electronic device 1, and may be a relative velocity or the like between the object 200 and the electronic device 1, for example. In this case, the controller 10 may detect the relative velocity between the object 200 and the electronic device 1. Alternatively, the velocity FFT processing unit 12 or the distance-velocity detection determining unit 13 may detect the relative velocity. As described above, the controller 10 may use, as multiple pieces of detected data, the distance between the object 200 and the electronic device 1 generated based on detection of the object 200 or the relative velocity between the object 200 and the electronic device 1 generated based on detection of the object 200.

In response to the start of the operation illustrated in FIG. 4, the controller 10 detects the distance between the object 200 and the electronic device 1, as pieces of detected data at a predetermined time (t0, for example) (step S11).

For example, as indicated in step S11 of FIG. 5, the controller 10 detects N pieces of data d1(t0), d2(t0), d3(t0), . . . , dN(t0) as the pieces of detected data at the predetermined time point t0. As described above, each of these values may be data indicating the distance between the object 200 and the electronic device 1 at the time point t0. Hereinafter, a piece of data (indicating the distance in this example case) detected by (the controller 10 of) the electronic device 1 is also referred to as a "piece of detected data" for convenience.

These pieces of detected data may be detected as multiple pieces of data when multiple objects 200 are located around the electronic device 1, for example. In reality, these pieces of data may be detected as multiple pieces of detected data because of an influence of so-called multipath even if the pieces of data indicate the distance between the single object 200 and the electronic device 1.

As illustrated in FIG. 4, in response to detecting the pieces of detected data in step S11, the controller 10 selects reference data from among the pieces of detected data (step S12). The reference data may be data selected from among the pieces of detected data detected in step S11 and to be used as a reference when a group of pieces of detected data is generated.

For example, in step S12, the controller 10 may select, as the reference data, a piece of detected data having the minimum value among the pieces of detected data. For example, in step S12, the controller 10 may select, as the reference data, a piece of detected data corresponding to a value that is close to a value obtained by adding a predetermined value to the minimum value among the pieces of detected data. The predetermined value may be, for example, a threshold described below. As described above, the controller 10 may select, as reference data at a predetermined time point (t0, for example), a piece of detected data corresponding to a value that is close to a value obtained by adding a predetermined value to the minimum value among multiple pieces of detected data at the predetermined time point (t0, for example). Alternatively, in step S12, the controller 10 may select, as the reference data, any piece of detected data from among the pieces of detected data. As described above, the controller 10 may set, as reference data at a predetermined time point (t0, for example), a piece of data selected from among multiple pieces of detected data at the predetermined time point (t0, for example).

As illustrated in FIG. 4, in response to selecting the reference data in step S12, the controller 10 generates a group of pieces of detected data based on the selected reference data (step S13). For example, in step S13, the controller 10 may generate the group of pieces of detected data by putting, into the same group, pieces of detected data corresponding to values that are within a predetermined difference from the value indicated by the reference data. That is, in step S13, the controller 10 may include multiple pieces of detected data in the same group if absolute values of differences between the value indicated by the reference data and values indicated by the respective pieces of detected data are equal to or less than a predetermined threshold. The predetermined threshold may be, for example, a value indicating a distance of 5 m in the case of an on-vehicle radar or the like. As described above, the controller 10 may put, into the same group at a predetermined time point (t0, for example), pieces of detected data corresponding to values that are within the predetermined difference from the value indicated by the reference data at the predetermined time point (t0, for example) among the multiple pieces of detected data at the predetermined time point (t0, for example).

For example, as indicated in step S11 of FIG. 5, the controller 10 detects N pieces of data d1(t0), d2(t0), d3(t0), . . . , dN(t0) as the pieces of detected data at the predetermined time point t0. Then, as indicated in step S12 of FIG. 5, the controller 10 selects dr1(t0) as the reference data from among the N pieces of detected data indicated in step S11 of FIG. 5. In this case, the controller 10 generates a group of pieces of detected data by putting, into the same group, pieces of detected data of which respective differences from the reference data dr1(t0) are equal to or less than the predetermined threshold among the N pieces of detected data indicated in step S11 of FIG. 5, for example.

The N pieces of detected data indicated in step S11 in FIG. 5 include, for example, M1 pieces of detected data da1(t0), db1(t0), dc1(t0), . . . of which respective differences from the reference data dr1(t0) are equal to or less than the predetermined threshold. In this case, the controller 10 sets the M1 pieces of detected data da1(t0), db1(t0), dc1(t0), . . . as pieces of detected data included in the same group G1(t0). That is, all differences between the value indicated by the reference data dr1(t0) and values indicated by the respective M1 pieces of detected data da1(t0), db1(t0), dc1(t0), . . . that are the pieces of detected data included in the group G1(t0) are equal to or less than the predetermined threshold.

In the example described above, the controller 10 puts, into the same group, pieces of detected data indicating values that are within a predetermined difference from the value indicated by the reference data. However, in one embodiment, the controller 10 may generate a group based on another rule.

As illustrated in FIG. 4, in response to generating the group of the pieces of detected data in step S13, the controller 10 generates representative data based on the pieces of detected data included in the group (step S14).

For example, as indicated in step S13 of FIG. 5, the pieces of detected data included in the group G1(t0) are M1 pieces of detected data da1(t0), db1(t0), dc1(t0), and so on. In this case, as indicated in step S14 of FIG. 5, the controller 10 generates representative data g1(t0) of the group G1(t0) based on the M1 pieces of detected data. In step S14, for example, the controller 10 may calculate, as the representative data g1(t0), an average value of the pieces of detected data included in the group G1(t0). In step S14, for example, the controller 10 may select, as the representative data g1(t0), the maximum value or the minimum value of the pieces of detected data included in the group G1(t0). As described above, the controller 10 may set the average value, the minimum value, or the maximum value of pieces of detected data included in the same group (G1(t0), for example) at the predetermined time point (t0, for example), to be the representative data (g1(t0), for example) at the predetermined time point (t0, for example). In one embodiment, the controller 10 may set a median value or an average value in a range around the median value of the pieces of detected data included in the same group at the predetermined time point, to be the representative data at the predetermined time point. If the reference data alone is present in the group, the controller 10 may set the reference data as the representative data. That is, in this case, only the one piece of detected data included in the group is the reference data and the representative data. In the first embodiment (time-point-independent grouping), since the reference data is selected from among pieces of detected data at the current time point, the group includes at least one piece of reference data.

In response to generating the representative data in the group in step S14, the controller 10 performs processing of step S15. In step S15, the controller 10 determines whether all the pieces of detected data at the predetermined time point (t0, for example) have been selected. That is, in step S15, the controller 10 determines whether groups are generated such that every piece of detected data indicated in step S11 of FIGS. 4 and 5 is included in any of the groups.

If all the pieces of detected data have not been selected in step S15, that is, if a piece of detected data (or pieces of detected data) not included in any of the groups remain(s), the process returns to step S12 and the controller 10 may select reference data from the remaining piece(s) of detected data.

For example, upon the process returning to step S12, the controller 10 may select next reference data (dr2(t0), for example) from the pieces of detected data indicated in step S11 of FIGS. 4 and 5. For example, in step S13, based on the reference data (dr2(t0), for example), the controller 10 may generate a group (G2(t0), for example) of pieces of detected data by putting, into the same group, pieces of detected data corresponding to values that are within the predetermined difference from the value indicated by the reference data. The remaining pieces of detected data of which differences from the reference data dr2(t0) are equal to or less than the predetermined threshold among the pieces of detected data indicated in step S11 of FIGS. 4 and 5 are, for example, M2 pieces of detected data da2(t0), db2(t0), dc2(t0), and so on. In this case, the controller 10 sets the M2 pieces of detected data da2(t0), db2(t0), dc2(t0), . . . as pieces of detected data included in the same group G2(t0). That is, differences between the value indicated by the reference data dr2(t0) and values indicated by the M2 pieces of detected data da2(t0), db2(t0), dc2(t0), . . . that are the pieces of detected data included in the group G2(t0) are equal to or less than the predetermined threshold.

By repeating the operation described above, the electronic device 1 can obtain the following result as illustrated in FIG. 5.

The group G1(t0) is a group of pieces of detected data that is generated based on the reference data dr1(t0). The group G1(t0) includes M1 pieces of detected data da1(t0), db1(t0), dc1(t0), and so on. In the group G1(t0), the representative data g1(t0) is generated based on the M1 pieces of detected data described above.

The group G2(t0) is a group of pieces of detected data that is generated based on the reference data dr2(t0). The group G2(t0) includes M2 pieces of detected data da2(t0), db2(t0), dc2(t0), and so on. In the group G2(t0), representative data g2(t0) is generated based on the M2 pieces of detected data described above.

A group G3(t0) is a group of pieces of detected data that is generated based on reference data dr3(t0). The group G3(t0) includes M3 pieces of detected data da3(t0), db3(t0), dc3(t0), and so on. In the group G3(t0), representative data g3(t0) is generated based on the M3 pieces of detected data described above.

A group GL(t0) is a group of pieces of detected data that is generated based on reference data drL(t0). The group GL(t0) includes ML pieces of detected data daL(t0), dbL(t0), dcL(t0), and so on. In the group GL(t0), representative data gL(t0) is generated based on the ML pieces of detected data described above.

As described above, the controller 10 may generate, based on reference data, a group from multiple pieces of detected data generated based on detection of an object, and generate representative data based on one or more pieces of detected data included in the group. More specifically, the controller 10 may generate, based on reference data at a predetermined time point (t0, for example), a group at the predetermined time point (t0, for example) from multiple pieces of detected data at the predetermined time point (t0, for example) generated based on detection of an object. The controller 10 may generate representative data at the predetermined time point (t0, for example), based on one or more pieces of detected data included in the group at the predetermined time point (t0, for example).

In the above manner, the electronic device 1 can generate (L) pieces of representative data at the time point t0 from the (N) pieces of detected data at the time point t0. Thus, the controller 10 of the electronic device 1 may output the pieces of representative data at the predetermined time point (t0, for example), as a detection result of the object at the predetermined time point (t0, for example).

On the other hand, as illustrated in FIG. 4, if all the pieces of detected data have been selected in step S15, the controller 10 may end the operation illustrated in FIG. 4. In this case, the controller 10 may start the operation illustrated in FIG. 4 again for a next predetermined time point (t1, for example). Thereafter, the controller 10 may sequentially repeat the operation illustrated in FIG. 4 at respective predetermined time points. In this manner, the controller 10 may generate representative data at the predetermined time point (t0, for example), based on one or more pieces of detected data included in the group at the predetermined time point (t0, for example). After generating the representative data at the predetermined time point (t0, for example), the controller 10 may generate representative data at a subsequent time point (t1, for example) of the predetermined time point, based on one or more pieces of detected data included in a group at the subsequent time point (t1, for example) of the predetermined time point.

In the technology such as the millimeter-wave radar, for example, a radio wave is transmitted and a reflected wave from an object is received. A frequency change and/or a time difference of the reflected wave is determined. In this manner, a distance or relative velocity to the object can be detected. In recent years, a so-called on-vehicle radar technology has been spreading in which an electronic device using the technology such as the millimeter-wave radar is mounted on a vehicle such as an automobile to detect an object located around the vehicle, for example. However, reflection becomes complicated when the vehicle equipped with the on-vehicle radar travels in a tunnel, when there are many vehicles traveling next to the vehicle, or when there is a topographically complicated place around the vehicle, for example. In this case, an influence of so-called multipath expectedly hinders the on-vehicle radar to correctly perform detection or makes the detection unstable. However, the electronic device 1 according to the first embodiment can reduce the influence of the multipath, for example. Thus, the electronic device 1 according to the first embodiment can stabilize detection of an object such as a target, for example.

Second Embodiment

An operation of an electronic device 1 according to a second embodiment is described. The operation of the electronic device 1 according to the second embodiment is also referred to as "consecutive grouping" since a data group is generated consecutively at each time point (time) when pieces of detected data are detected.

Figure 6:
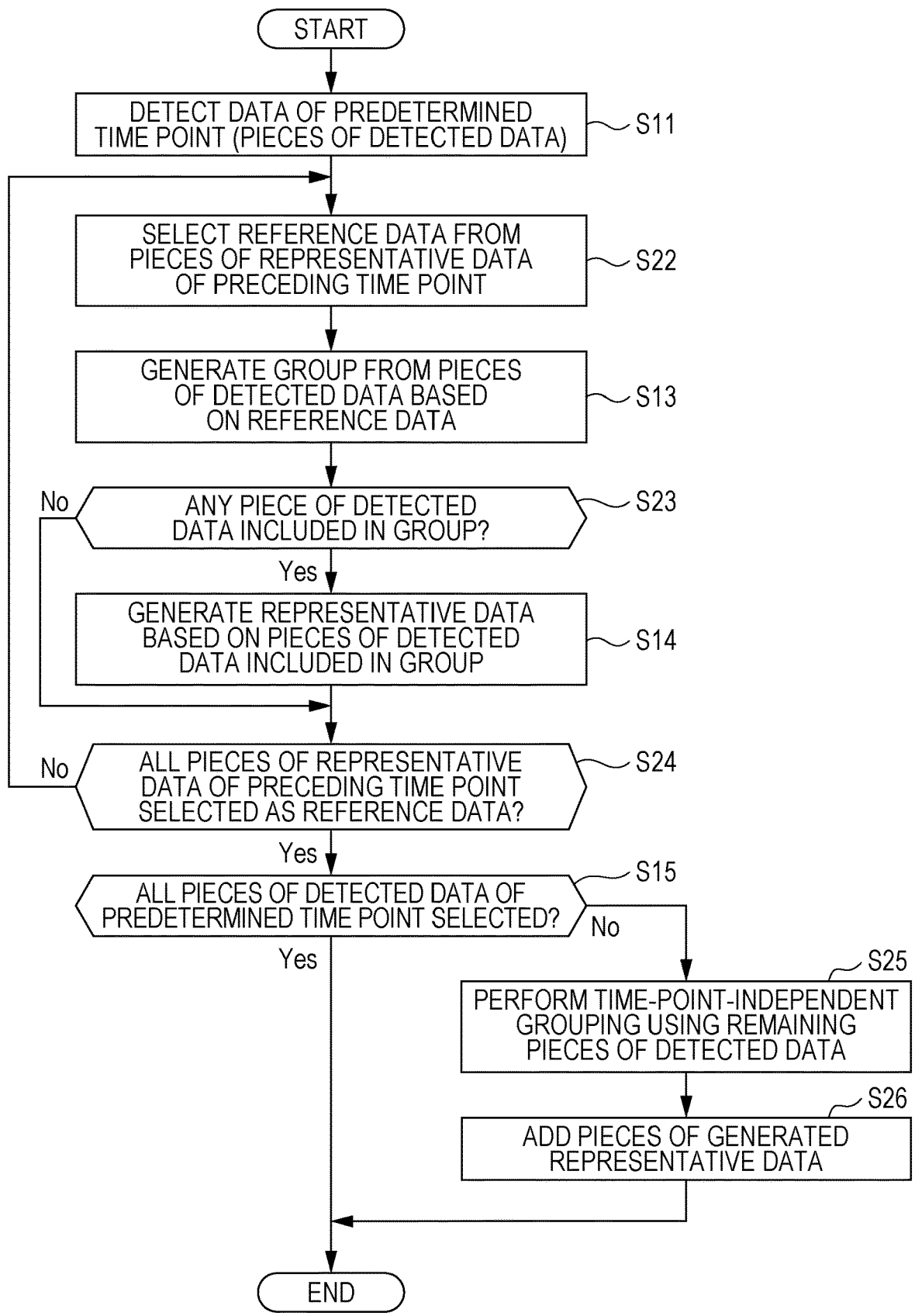
FIG. 6 is a flowchart for describing an operation of an electronic device according to a second embodiment.

FIG. 6 is a flowchart for describing the operation of the electronic device 1 according to the second embodiment. FIGS. 7 and 8 are diagrams for describing a process performed by the electronic device 1 according to the second embodiment. The operation of the electronic device 1 according to the second embodiment is described below with reference to FIGS. 6 to 8.

The second embodiment described below is equivalent to the first embodiment described above in which part of the operation is changed. Thus, the second embodiment can be implemented by using a configuration that is the same as and/or similar to the configuration of the electronic device 1 according to the first embodiment described above. More detailed description of the configuration of the electronic device 1 according to the second embodiment is thus omitted. In the description below, description that is the same as and/or similar to that of the first embodiment above is appropriately simplified or omitted.

In the description below, as indicated in step S11 of FIG. 7, the controller 10 detects N' pieces of data d1(t1), d2(t1), d3(t1), . . . , dN'(t1) as pieces of detected data at a predetermined time point t1. At the time point when the operation illustrated in FIG. 6 starts, the controller 10 has already generated the pieces of representative data g1(t0), g2(t0), g3(t0), . . . , gL(t0) at the time point t0 based on the pieces of detected data at the time point t0. The pieces of representative data at the time point t0 may be generated as a result of the operation illustrated in the flowchart of FIG. 6, for example, being performed at least once (before the time t1 when the current pieces of detected data are detected). The pieces of representative data at the time point t0 may be generated as a result of the time-point-independent grouping operation illustrated in the flowchart of FIG. 4, for example, being performed at least once (before the time t1 when the current pieces of detected data are detected).

In the operation illustrated in FIG. 4, after the pieces of detected data are detected at the predetermined time point (t0) (step S11), the reference data at the predetermined time point (t0) is selected from among the pieces of detected data (step S12). By contrast, in the operation illustrated in FIG. 6, after the pieces of detected data are detected at the predetermined time point (t1) (step S11), the reference data is selected from among the pieces of representative data generated at the preceding time point (to, for example) of the predetermined time point (t1) (step S22). Specifically, as indicated in step S12 of FIG. 5, in the time-point-independent grouping, the pieces of reference data dr1(t0), dr2(t0), and the like at the predetermined time point (t0) are selected from among the pieces of detected data at the predetermined time point (t0). By contrast, as indicated in step S22 of FIG. 7, in the consecutive grouping, pieces of reference data g1(t0), g2(t0), and the like at the predetermined time point (U) are selected from among the pieces of detected data at the preceding time point (t0) of the predetermined time point (t1). As described above, the controller 10 may set data selected from among one or more pieces of representative data at a preceding time point (t0, for example) of the predetermined time point (t1, for example), to be the reference data at the predetermined time point (t1, for example).

In response to selecting the reference data from among the pieces of representative data generated at the preceding time point (t0) as illustrated in step S22 of FIG. 6, the controller 10 generates a group of pieces of detected data based on the selected reference data (step S13). The processing in step S13 may be performed in the same and/or similar manner as/to the first embodiment described above. The group of the pieces of detected data thus generated can be indicated in step S13 of FIG. 7, for example.

In the second embodiment (consecutive grouping), since the reference data is selected from among the pieces of representative data at the preceding time point, there may be no current detected data that meets a condition of the reference data. In this case, the representative data at the preceding time point is not settable as the reference data of the group, and the group includes no detected data.

Thus, as illustrated in FIG. 6, in response to generating the group of pieces of detected data in step S13, the controller 10 determines whether the group includes any piece of detected data (step S23). If the group includes one or more pieces of detected data in step S23, the controller 10 generates representative data based on the one or more detected data included in the group (step S14). The processing in step S14 may be performed in the same and/or similar manner as/to the first embodiment described above. On the other hand, if the group includes no detected data in step S23, the controller 10 may skip the processing of step S14. That is, for example, when a group G1(t1) illustrated in FIG. 7 includes no detected data, the controller 10 may skip generating representative data g1(t1) and the process may proceed to step S24.

As illustrated in FIG. 6, in response to generating the representative data of the group in step S14 or skipping the processing of step S14 after step S23, the controller 10 performs processing of step S24. As illustrated in FIG. 6, in step S24, the controller 10 determines whether all the pieces of representative data at the preceding time point (t0) have been selected as the reference data.

If any of the pieces of representative data at the preceding time point (t0) has not been selected as the reference data in step S24, the process returns to step S22 and the controller 10 may select the reference data from the remaining piece(s) of representative data. On the other hand, if all the pieces of representative data at the preceding time point (t0) have been selected as the reference data in step S24, the controller 10 then performs processing of step S15. In step S15, the controller 10 determines whether all the pieces of detected data at the predetermined time point (t1, for example) have been selected. That is, in step S15, the controller 10 determines whether groups are generated such that every piece of detected data indicated in step S11 of FIGS. 6 and 7 is included in any of the groups.

If all the pieces of detected data have been selected in step S15, the controller 10 may end the operation illustrated in FIG. 6. In this case, the controller 10 may start the operation illustrated in FIG. 6 again for a next predetermined time point (t2, for example). Thereafter, the controller 10 may sequentially repeat the operation illustrated in FIG. 6 at respective predetermined time points.

By repeating the operation described above, the electronic device 1 can obtain the following result as illustrated in FIG. 7.

The group G1(t1) is a group of pieces of detected data that is generated based on the reference data g1(t0). The group G1(t1) includes M'1 pieces of detected data da1(t1), db1(t1), dc1(t1), and so on (step S13 in FIG. 7). In the group G1(t1), the representative data g1(t1) is generated based on the M'1 pieces of detected data described above (step S14 in FIG. 7).

A group G2(t1) is a group of pieces of detected data that is generated based on the reference data g2(t0). The group G2(t1) includes M'2 pieces of detected data da2(t1), db2(t1), dc2(t1), and so on (step S13 in FIG. 7). In the group G2(t1), representative data g2(t1) is generated based on the M'2 pieces of detected data described above (step S14 in FIG. 7).

A group G3(t1) is a group of pieces of detected data that is generated based on the reference data g3(t0). The group G3(t1) includes M'3 pieces of detected data da3(t1), db3(t1), dc3(t1), and so on (step S13 in FIG. 7). In the group G3(t1), representative data g3(t1) is generated based on the M'3 pieces of detected data described above (step S14 in FIG. 7).

A group GL'(t1) is a group of pieces of detected data that is generated based on reference data gL'(t0). The group GL'(t1) includes M'L' pieces of detected data daL'(t1), dbL'(t1), dcL'(t1), and so on (step S13 in FIG. 7). In the group GL'(t1), representative data gL'(t1) is generated based on the M'L' pieces of detected data described above (step S14 in FIG. 7).

On the other hand, if all the pieces of detected data have not been selected in step S15, that is, if a piece of detected data (or pieces of detected data) not included in any of the groups remain(s), the controller 10 may perform the operation of step S25 and subsequent step illustrated in FIG. 6.

In step S25, the controller 10 may generate representative data through time-point-independent grouping illustrated in FIGS. 4 and 5 by using the remaining piece(s) of detected data. For example, in step S15 illustrated in FIG. 6, the remaining pieces of detected data at the time point t1 are K pieces of data du1(t1), du2(t1), du3(t1), . . . , duK(t1) as illustrated in FIG. 8. In this case, the controller 10 may select reference data from among the remaining pieces of detected data in accordance with the time-point-independent grouping, generate a group of pieces of detected data based on the reference data, and generate representative data of the group. Specifically, the controller 10 selects reference data of each group from among the remaining pieces of detected data du1(t1), du2(t1), du3(t1), . . . , duK(t1) illustrated in FIG. 8. Based on the selected reference data, the controller 10 generates a group of pieces of detected data from the remaining pieces of detected data du1(t1), du2(t1), du3(t1), . . . , duK(t1) illustrated in FIG. 8. Based on the pieces of detected data included in each generated group, the controller 10 may generate representative data of the group.

As described above, the controller 10 may generate, based on the reference data at the predetermined time point (t1, for example), a group at the predetermined time point (t1, for example) from one or more pieces of detected data not included in any group at the predetermined time point (t1, for example).

Through the time-point-independent grouping described above, the electronic device 1 can obtain the following result as illustrated in FIG. 8.

A group G'1(t1) is a group of pieces of detected data that is generated based on reference data dur1(t1). The group G'1(t1) includes M'1 pieces of detected data dua1(t1), dub1(t1), and so on. In the group G'1(t1), representative data gL'+1(t1) is generated based on the M'1 pieces of detected data described above (step S25 in FIG. 8).

A group G'2(t1) is a group of pieces of detected data that is generated based on reference data dur2(t1). The group G'2(t1) includes M'2 pieces of detected data dua2(t1), dub2(t1), and so on. In the group G'2(t1), representative data gL'+2(t1) is generated based on the M'2 pieces of detected data described above (step S25 in FIG. 8).

A group G'1"(t1) is a group of pieces of detected data that is generated based on reference data durL"(t1). The group G'L"(t1) includes M'L" pieces of detected data duaL"(t1), dubL"(t1), and so on. In the group G'L"(t1), representative data gL'+L"(t1) is generated based on the M'L" pieces of detected data described above (step S25 in FIG. 8).

Through the time-point-independent grouping performed using the remaining pieces of detected data in step S25 illustrated in FIG. 6, the pieces of representative data gL'+1(t1), gL'+2(t1), . . . gL'+L"(t1) at the time point t1 are generated as illustrated in FIG. 8, for example.

In response to the time-point-independent grouping performed in step S25 illustrated in FIG. 6, the controller 10 may additionally output the pieces of representative data generated in step S25 to the pieces of representative data generated in step S14 (step S26). For example, the controller 10 may add the pieces of representative data gL'+1(t1), gL'+2(t1), . . . , gL'+L"(t1) generated in step S25 of FIG. 8 to the pieces of representative data g1(t1), g2(t1), . . . , gL'(t1) generated in step S14 of FIG. 7. As a result, the controller 10 may generate g1(t1), g2(t1), . . . , gL'(t1), gL'+1(t1), gL'+2(t1), . . . gL'+L"(t1) as all the pieces of representative data at the time point t1 as indicated in step S26 of FIG. 8, for example.

As described above, the electronic device 1 according to the second embodiment can also reduce the influence of the multipath, for example. Thus, the electronic device 1 according to the second embodiment can stabilize detection of an object such as a target, for example.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1.

The electronic device 1 according to one embodiment may include, as the minimum configuration, at least part of at least one of the sensor 5 or the controller 10, for example. On the other hand, the electronic device 1 according to one embodiment may appropriately include at least any of the signal generating unit 21, the synthesizer 22, the phase control units 23, the amplifiers 24, or the transmission antennas 25 illustrated in FIG. 2 in addition to the controller 10. The electronic device 1 according to the one embodiment may appropriately include at least any of the reception antenna 31, the LNA 32, the mixer 33, the IF unit 34, or the AD conversion unit 35 instead of or along with the functional units described above. The electronic device 1 according to the one embodiment may include the storage unit 40. As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antenna 25 or the reception antenna 31 may be installed outside the mobility device 100.

Any person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with a corresponding functional unit, a corresponding means, a corresponding step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

REFERENCE SIGNS 1 electronic device
5 sensor
10 controller
11 distance FFT processing unit
12 velocity FFT processing unit
13 distance-velocity detection determining unit
14 angle-of-arrival estimating unit
15 object detecting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU
100 mobility device
200 object

The invention claimed is:

1. An electronic device comprising:
a transmission antenna configured to transmit a transmission wave;
a reception antenna configured to receive a reflected wave that is the transmission wave having been reflected; and
a controller configured to detect an object that reflects the transmission wave, based on a transmission signal transmitted as the transmission wave and a reception signal received as the reflected wave,
wherein the controller is configured to generate a first plurality of pieces of detected data at a first time point based on the reception signal, generate a second plurality of pieces of detected data at a second time point after the first time point based on the reception signal, select a reference data from among the first plurality of pieces of detected data at the first time point, generate based on the reference data, a group of detected data from among the second plurality of pieces of detected data at the second time point, generate a representative data from among the group of detected data, and output the representative data as a detection result of detecting the object at the second time point.

* * * * *